Figure 1:
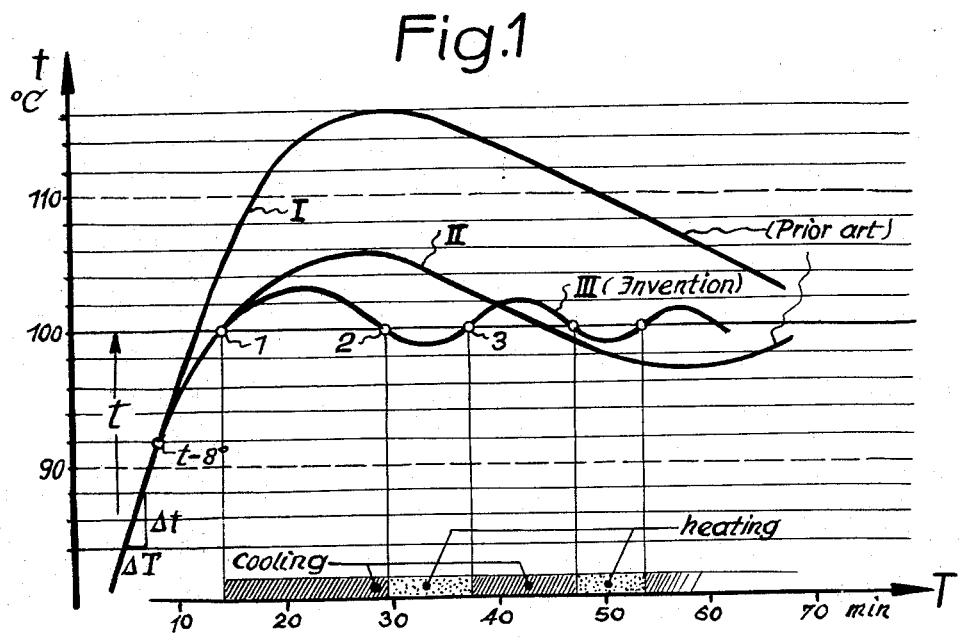

INVENTOR:
Hans Wentzel

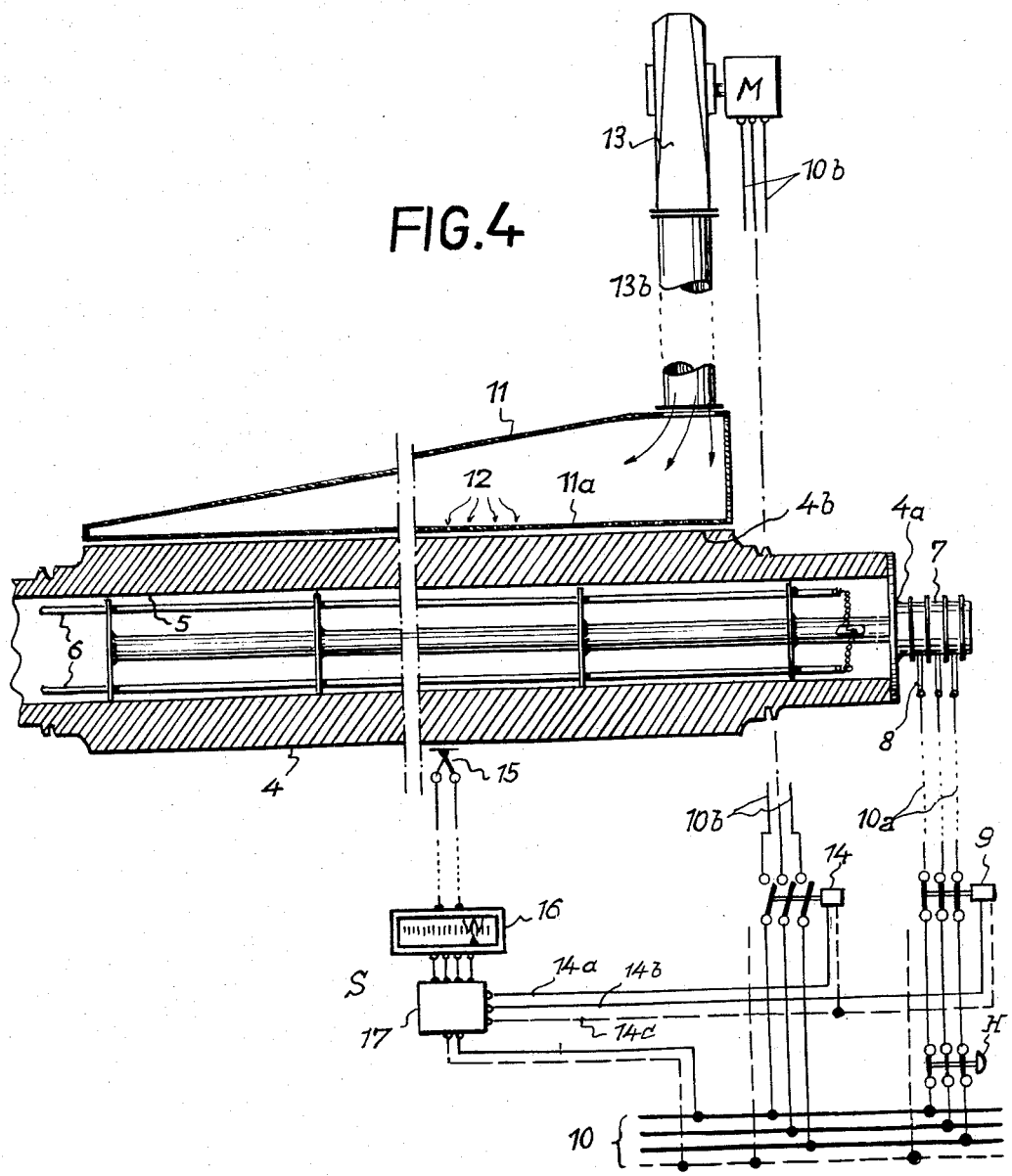

United States Patent Office 3,295,593
Patented Jan. 3, 1967

3,295,593
DEVICE FOR CONTROLLING THE TEMPERATURE
OF HEATED BODIES
Hans Wentzel, Knickelsdorf-im Fliess, Germany, assignor
to Joh. Kleinewefers Söhne, Krefeld, Germany
Filed Mar. 9, 1964, Ser. No. 350,942
Claims priority, application Germany, Mar. 12, 1963,
K 49,174
1 Claim. (Cl. 165—26)

The present invention relates to a device for controlling heated bodies. The automatic control of the temperature of a body heated at random is effected by a control device which is controlled by a temperature feeler feeling the temperature of the heated body.

When heating articles which have a great mass, it is a well-known fact that due to the time required for conveying the heat over the entire mass (dead time), the control circuit will be rather slow to react. This results in the fact that the temperature curve, especially when factors of disturbance are effective, will vary within wide ranges. Thus, for instance, with heavy calender rollers, dead times of from 5 to 10 minutes are encountered depending on the installed heat input with regard to the mass of the calender roller. As a result thereof, when heating up the respective body, and when the rated temperature has been reached, the course of the temperature varies with the wide ranges, for instance up to ±30° C. while the wave length of one oscillation may correspond to a number of hours. The amplitude of the over-oscillation depends primarily on the dead time $T_t$, whereas the speed at which the temperature at the roller surface increases after the rated value has been obtained and the heat has been turned off, is dependent on the starting period A, i.e. is proportional to the steepness of the temperature increase which is expressed by the differential coefficient $$\frac{\Delta t°C.}{\Delta T \text{ sec}}$$

For control sections with great dead time, therefore, return means are required which bring about that the measured value indicator (actual value) faster approaches the rated value than corresponds to the momentary value. These means operate in such a manner that the heat energy in the control circuit is turned off prior to reaching the rated value and is again turned on prior to reaching the rated value after the over-oscillation. The said means thus reduce the over-oscillation inasmuch as the obtainment of the rated value is advanced, or expressed differently, a higher temperature than the actual temperature is indicated. By means of this operation, the control curve is smoothened or reduced to a very minor variation which is dependent primarily on the precision of the measuring device itself. Inasmuch as with varying control the heat energy is switched on and off or increased or reduced, it is necessary that the control mechanism operates continuously, which means that the temperature curve cannot be a straight line but will be a line which represents a more or less varying sine curve.

For purposes of aiding the yieldable return mechanism, it has been suggested to operate with two-point controls according to which a cooling circuit will be turned on when the heat energy is turned off, and vice versa. This device, however, cannot satisfactorily meet the requirements because the reduction in temperature caused by the cooling circuit requires a considerable time for passing through the thick steel wall, in other words, requires a dead time so that also in this instance it is not possible to eliminate the influence of said dead time.

It is, therefore, an object of the present invention to provide a device for automatically controlling the temperature of heated bodies, which will overcome the above mentioned drawbacks.

It is another object of this invention in control circuits with high inertia to reduce to a minimum the deviation of the amplitude and wave length of the obtained temperature curves from the rated temperature curve.

These and other objects and advantages of the invention will appear more clearly from the following specification in connection with the accompanying drawing, in which:

FIG. 1 graphically illustrates three temperature graphs when heating up a heating device which reacts very slowly while the heat is respectively turned off at three different conditions.

Figure 2:
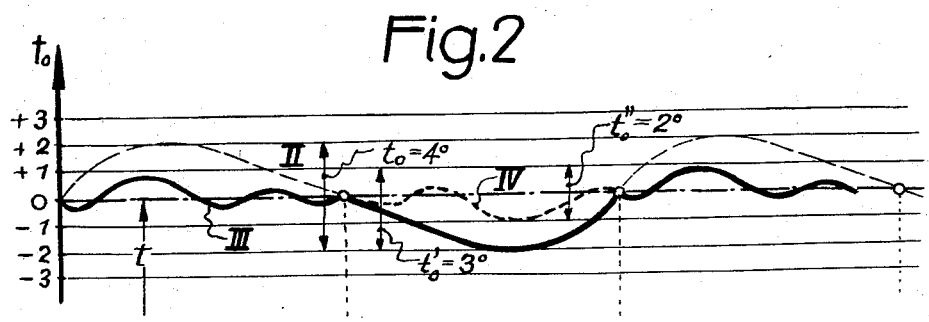
Figure 3:
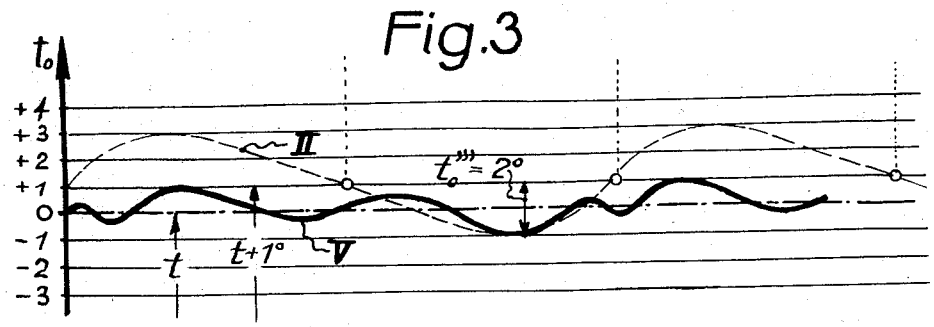

FIGS. 2 and 3 respectively show temperature curves at modified control operations.

FIG. 4 shows a calender roller with temperature control means according to the present invention.

The present invention is characterized primarily in that the control device is so designed that with the upward inclination of the control curve in addition to turning off the heating medium, a cooling medium is turned on which, however, in contrast to the heretofore known methods becomes effective not within the range of the heating medium but where the heat is withdrawn or the temperature is sensed. This may, for instance, be at the roller surface when calender rollers are heated. Inasmuch as this additional cooling device becomes effective directly on the surface of the roller, i.e. without dead time, the upper half of the amplitude is considerably smoothened out. The arrangement may be further improved in such a way that also the lower control amplitude will be smoothened out. In this instance, when again turning on the heating circuit, an additional heating system is made effective which, however, acts upon the surface of the drum only.

The present invention is particularly advantageously applicable to heating calender rollers which, as is well known, have a considerably long dead time in view of the great metal masses involved. The surface of such calender rollers is thermodynamically so instable (regardless of the control means employed) that such calender rollers can be used only under certain conditions with rather narrow temperature tolerances. This instability brings about that the heat quantity flowing through the operating roller to the material to be calendered will suddenly no longer be required when a work stoppage occurs and will bring about an undue increase in the surface temperature. Inversely, the surface temperature unduly drops when the calender rollers changes from its idling condition after a work stoppage to a working condition in which it suddenly has to furnish heat to the material to be calendered. The thermodynamic instability of calender rollers is under some circumstances so great that draft air will have an undesirable influence upon the surface temperature.

The present invention aids the temperature control to such an extent that the roller surface which in this instance acts as effective working surface will be cooled directly as soon as the temperature sensing measuring device ascertains an excess over the rated temperature.

The additional cooling device above referred to brings about thermodynamic preloading of the roller in its idling condition so that following work stoppages the necessary quantities of heat will be available at the surface of the calender roller so that the dead time will be reduced to a minimum and the operation can be carried out practically without loss. On the other hand, the cooling device will aid in a faster establishment of the rated temperature on the roller surface, whereas the over-oscillation which, under other circumstances in unavoidable and cannot be used for the operation, is completely eliminated or at least limited to a minimum time. The invention will best be understood with reference to the accompanying drawing.

Referring now to the drawing in detail, FIG. 1 illustrates a graph showing as abscissa, time in minutes and showing as ordinate, the temperature. More specifically, curve I shows the course of the temperature when heating a heating device which is rather slow in getting heated up, the rated value being assumed to be 100° C. When the heat input is turned off at the time the rated value has been obtained, the temperature curve will climb still further, due to the considerable dead time, the inclination will be approximately the same, but the curve will drop when the maximum amplitude of approximately 116° C. has been reached. The dropping branch of the temperature curve is substantially flatter than the climbing branch because the temperature drop between the roller surface and the surrounding air is not as great as between the heating medium and the surrounding wall of the drum bore. The curve indicates that the first half-cycle or half-wave requires the considerable time of 65 minutes, so that such a control is not usable particularly with regard to great variations in temperature.

When employing a non-steady control with yieldable return, the curve II is obtained. This curve is due to the fact that already at approximately 8° C. prior to reaching the rated value, the heat input is turned off, and is turned on again when the amplitude drops by about 4° with regard to the rated value. As a result thereof, the temperature curve is considerably flattened, and the time of a half-cycle amounts to only 45 minutes, while the further oscillations and amplitudes become somewhat smaller.

The curve III shows a temperature course of a control operating with a surface cooling in conformity with the present invention. Although in this connection, the heat input is turned off only when the rated value has been obtained, the temperature curve nevertheless becomes rather flat because the surface cooling becomes immediately effective. At point 2, the heat input is again turned on, and the cooling is turned off so that the curve, after a short drop, again climbs. At point 3, the cooling device is again turned on and the heat input is turned off. The curve smoothens out relatively quickly and continues within a narrow temperature range as a line similar to a sine line, the mean value corresponding to the rated value. The shaded strips in the diagram indicate the time during which the additional cooling is turned on.

It may now be assumed that with optimum adjustment of the return time and absence of disturbing factors, for instance the temperature course of a calender roller is represented by line II of FIG. 2 while the temperature varies between $+2°$ C. and $-2°$ C. with regard to the rated value, so that the temperature difference amounts to $t_0$ approximately 4° C. Since in many instances, with modern calendering methods, temperature variations must be limited between $+1$ and $-1°$ C., this control installation may additionally be provided with an additional cooling, in conformity with the present invention. Due to the cooling influence, the upper amplitude will be smoothed by the illustrated wave-line III whereas the lower amplitude remains unchanged. As a result thereof, the temperature variation of the actual value has been smoothened or reduced to $+1$ and $-2°$ C., so that $t_0'$ amounts to only 3° C.

In order also to smooth out the lower half-wave, it is possible to provide an additional heating device adapted to act upon the surface of the roller. This additional heating device is turned on at point 3' whereby the dash curve IV is obtained, so that the temperature difference $t_0''$ will amount to only 2° C.

According to a further development of the invention, the same effect may also be obtained by adjusting the indicator of the control for controlling the heating medium at about 1° above the rated value, whereas the additional cooling device will be turned on when the rated value has been obtained. In this way, the control curve of the cooling device is, relative to the control curve of the controlling device, displaced somewhat in downward direction, and the control curve V of FIG. 3 is obtained. As will be seen therefrom, the amplitudes of control curve V vary only between $+1$ and $-1°$ with regard to the rated value, so that $t_0''$ will amount to only 2° C.

Reversing the first embodiment of the invention, the arrangement may also be such that merely an additional heating device is provided by means of which the curve representing the value below the rated value, will be elevated. Such an arrangement would, for instance, be advantageous when heating great quantities of liquid if it is desired that the liquid being discharged will have a constant temperature. In this instance, the heating device will be arranged in the container in which the fluid is being heated, whereas the temperature sensing device will be arranged at the discharge opening and accordingly, the additional heating device will be arranged shortly ahead thereof in the form of a heating coil.

It is, of course, to be understood that the output of the cooling device and the additional heating device has to be adapted to the heating input to be conveyed to the body to be heated or to the dead time and the heating time for the entire system.

With calender rollers, the cooling device is expediently designed as narrow air nozzle through which compressed air is, at a uniform strength, blown over the entire length of the roller. In view of the high speed of the air, a good cooling effect is exerted upon the steel roller. Such an arrangement may, for instance, be designed as shown in FIG. 4. As will be seen therefrom, a calender roller 4 is provided with a longitudinal bore 5 having heating elements 6 arranged therein. These heating elements are adapted to receive their energizing current from a network 10 through the intervention of conductors 10a having interposed therein a switch 9. The conductors 10a lead to contact member 8 which slidably engage slip rings 7 arranged on an extension 4a of roller 4.

The arrangement furthermore comprises a cooling device generally designated C which includes a blower 13 communicating through a connecting pipe 13b with a distributor 11 having its bottom 11a arranged adjacent the peripheral surface 4b of calender roller 4. The bottom 11a of distributor 11 is provided with a plurality of discharge apertures 12. The blower 13 is drivingly connected to a motor M which in its turn, through conductors 10b, is connected with the network 10. Interposed in such conductors 10b is a switch 14 which in its turn is adapted to be controlled by a control device S through the intervention of conductors 14a, 14b and amplifier 17. The said control device S has connected thereto a temperature sensing means 15 which is arranged adjacent the peripheral surface 4b of calender roller 4 and is adapted to convey the sensed temperature to said control device S. The control device S is furthermore, through amplifier 17 and conductors 14b and 14c connected with a switch 9 interposed in conductors 10a. The switches 9 and 14 are controlled by the control device S in conformity with the temperature sensed by the temperature sensing means. The arrangement is such that when the temperature sensed by sensing means 15 is below a certain rated temperature, switch 14 will be in the open position shown in FIG. 4, whereas switch 9 will be in the closed position shown in FIG. 4. Finally, the circuit just described is provided with a manually operable master switch H adapted selectively manually to be closed and opened.

OPERATION

It may be assumed that the calender roller 4 is in cold condition, in which switch 9 is closed and switch 14 is open, and that it is now desired to heat up calender roller 4. To this end, the operator first closes the manual switch H so that the energizing circuit for the heating element 6 is closed. Calender roller 4 now heats up, whereas the cooling device C is inactive.

After the calender roller 4 has reached a temperature which exceeds the rated value at which latter the calender roller is normally to be operated, so that the sensing device 15 reports this increased temperature to the control device S, the latter causes switch 9 to open and switch 14 to close. Opening of switch 9 interrupts the heating circuit for the heating element 6 so that for the time being, no further heating up of the heating element 6 will occur. Closure of switch 14 closes the energizing circuit for the blower motor M so that the latter will drive blower 13 and cause the same to convey a cooling medium as, for instance air, through pipe 13b and the apertures 12 of the distributor 11, thereby cooling the circumferential surface 4b of calender roller 4. In this way, the rated temperature for the calender surface 4b will be restored.

If it should now occur that the temperature of the circumferential surface 4b of calender roller 4 drops below the rated value, this temperature drop is immediately conveyed by the sensing means 15 to control device S which thereupon causes switch 9 to open and switch 14 to close. The opening of switch 9 makes the cooling device C ineffective and again closes the heating circuit for the element 6, with the result that these elements bring the temperature of the circumferential roller surface 4b up to the rated value.

The additional heating device previously referred to in connection with FIGS. 1 to 3 may be designed similar to the cooling device C. In this instance, of course, instead of blowing a cooling medium onto the peripheral surface of calender roller 4, there will be blown a heating medium onto the said circumferential area. As heating medium may be used, for instance, hot air. While the heating device described above may, of course, also be replaced by any other suitable heating devices of any standard type, it may be added that the employment of infra-red heating devices is disadvantageous when steel rollers are involved. This is due to the low radiation coefficient of the surface of such steel rollers.

It is, of course, to be understood that the present invention is, by no means, limited to the particular methods and arrangements referred to above, but also comprises any modifications within the scope of the appended claims.

It is furthermore to be understood that preferably the temperature control according to the present invention becomes effective only after the sensed temperature differs from the rated temperature at least in one direction by a certain temperature value.

What I claim is:

In combination with a hollow calender roller: heating means arranged within said calender roller for heating the same, cooling means arranged outside of and near the outer peripheral surface of said calender roller for applying a cooling medium directly onto said outer peripheral surface to cool the same, temperature sensing means arranged adjacent said outer peripheral surface of said calender roller for sensing the temperature on said outer peripheral surface, said cooling means including a container adapted to receive cool air and having a bottom extending in the longitudinal direction of said roller and being closely spaced to the outer peripheral surface thereof, said bottom being provided with rows of apertures for conveying cooling air therethrough, and electric control means operatively connected to said sensing means on one hand and to said heating means and said cooling means on the other hand and operable automatically to control said heating means and said cooling means in conformity with said temperature variations occurring relative to a certain temperature and sensed by said sensing means.

References Cited by the Examiner
UNITED STATES PATENTS 2,721,729 10/1955 Van Riper ........... 165—64
3,074,695 1/1963 Hold et al. ......... 165—64

MEYER PERLIN, *Primary Examiner.*

CHARLES SUKALO, ROBERT A. O'LEARY,
*Assistant Examiners.*